United States Patent [19]
Arndt et al.

[11] Patent Number: 5,198,404
[45] Date of Patent: Mar. 30, 1993

[54] PLATINUM-RHENIUM CATALYST

[75] Inventors: John H. Arndt, Berkeley; Robert L. Jacobson, Vallejo, both of Calif.

[73] Assignee: Chevron Research and Technology Company, San Francisco, Calif.

[21] Appl. No.: 786,652

[22] Filed: Nov. 1, 1991

[51] Int. Cl.$^5$ ................ B01J 21/04; B01J 23/36; B01J 27/13
[52] U.S. Cl. .................................... 502/230
[58] Field of Search ................... 502/230, 334

[56] References Cited
U.S. PATENT DOCUMENTS
4,356,081 10/1982 Gallagher et al. ............ 502/230 X FOREIGN PATENT DOCUMENTS
1168215 5/1984 Canada .................. 502/334

OTHER PUBLICATIONS
"Platforming Catalyst Chemistry", pp. 38-39 Doc No. 117013&015 Rev. 1 UOP, Inc.

Primary Examiner—W. J. Shine
Attorney, Agent, or Firm—W. Keith Turner; Robert D. Touslee

[57] ABSTRACT

A catalyst composition and process for using said catalyst is disclosed wherein the catalyst comprises 0.24 to 0.26 weight percent platinum and 0.48 to 0.52 weight percent rhenium disposed on an alumina spheroidal carrier.

3 Claims, 2 Drawing Sheets

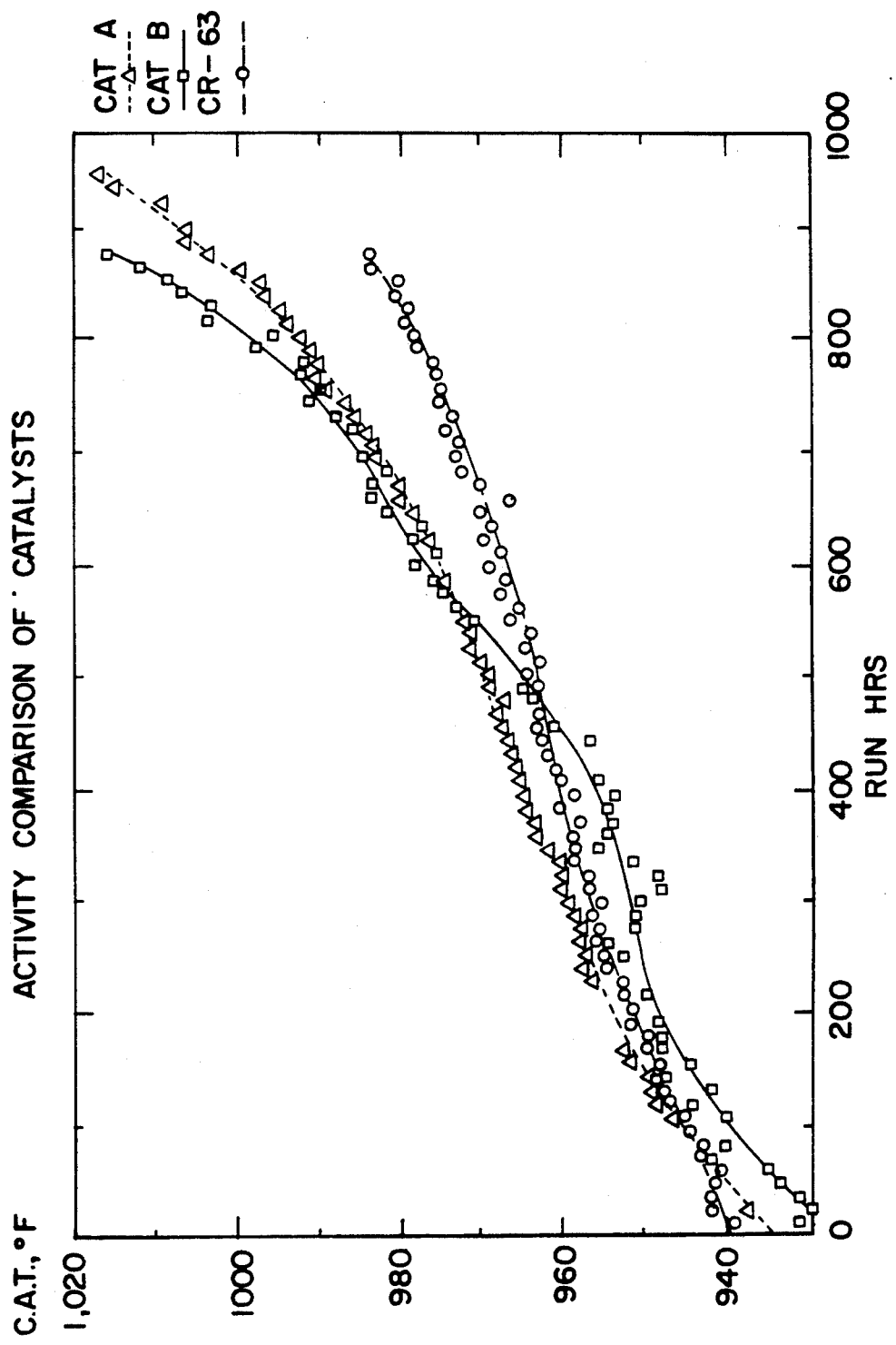
FIG.1 ACTIVITY COMPARISON OF CATALYSTS

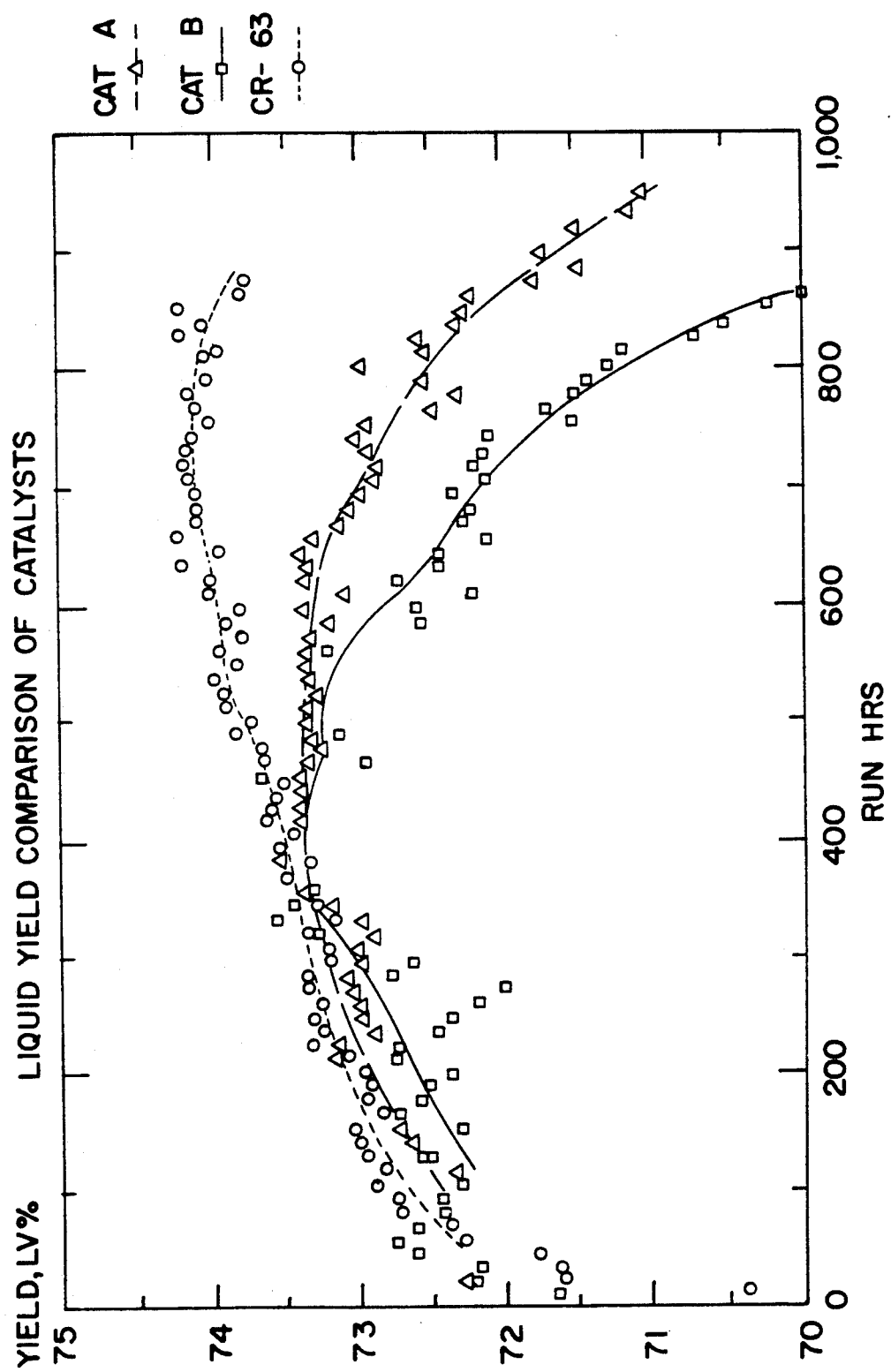

PLATINUM-RHENIUM CATALYST

BACKGROUND OF THE INVENTION

This invention relates to a catalytic composite for the conversion of hydrocarbons. Additionally, the invention relates to a process for the use of the catalyst. The catalyst of the present invention is particularly useful in the catalytic reforming of hydrocarbons boiling in the gasoline range to produce in high yield a high octane reformate suitable for blending gasolines of improved anti-knock properties.

Catalytic reforming to upgrade naphtha or low-boiling range hydrocarbons to higher octane gasoline has been practiced for many years using catalysts comprising platinum on a refractory support, such as alumina. In the 1960's a major advance was made in this area when it was discovered that, in reforming a low-sulfur content hydrocarbon feedstock, the use of a catalyst comprising platinum and rhenium on alumina provided greatly improved yield stability and a much lower fouling rate. See U.S. Pat. No. 3,415,737 to Kluksdahl.

Since that time, a number of other patents have issued in the area of catalytic reforming using platinum-rhenium catalysts. Some of these patents have been particularly focused on use of relatively high rhenium to platinum ratio catalysts, including the following: U.S. Pat. No. 4,356,081 to Gallagher, which discloses the use of catalysts having rhenium to platinum ratios of from about 1.08 up to as high as 17, rhenium contents from 0.362 to 0.875 weight percent and platinum contents from 0.05 to 0.344 weight percent; U.S. Pat. No. 4,425,222 to Swan, which discloses multi-stage reforming using forward reactors having a catalyst with rhenium to platinum ratio less than 1.2 a rearward reactor having a catalyst with a rhenium to platinum ratio greater than 1.5, and a swing reactor having some catalyst of each ratio.

Platinum-alumina reforming catalysts are often made by impregnating alumina with a platinum compound. For example, U.S. Pat. No. 3,617,519 discloses the preparation of a platinum-rhenium-alumina reforming catalyst wherein the platinum is impregnated into an alumina support by commingling the alumina support with an aqueous solution of chloroplatinic acid. Following the platinum impregnation, the impregnated carrier is typically dried and subjected to a conventional high temperature calcination or oxidation treatment.

U.S. Pat. No. 3,617,519 discloses that in most cases it is advantageous to adjust the concentration of the halogen component in the platinum-rhenium-alumina catalyst during the calcination step by injecting, into the air stream used therein, an aqueous solution of a suitable halogen-containing compound. U.S. Pat. No. 3,617,519 discloses that the halogen component can be added to the catalyst in various ways including adding the halogen during the impregnation through the utilization of a mixture of chloroplatinic acid and hydrogen chloride.

Typical calcination temperatures used in the preparation of the alumina support for reforming catalysts cover a wide range from about 800° to 1300° F., and frequently are 1100° F. or lower.

"Rheniforming F" catalyst, containing about 0.3 weight percent Pt, and about 0.6 weight percent Rhenium on an extruded alumina carrier has been marketed by the assignee of the present invention.

Rheniforming F has been sold under license and successfully used commercially for many years. This catalyst is particularly described as the first stage catalyst of the catalyst system described in U.S. Pat. No. 4,764,267 to Chen et. al. Rheniforming F is an extruded catalyst, that is, it is substantially cylindrical in shape. The extruded Rheniforming F catalyst has a bulk density of about 0.6 cc/g and a particle density of about 1.00 cc/g. A typical tamped packed bulk density is about 0.65 cc/g.

It is typically believed the yield stability performance of Rheniforming type catalysts are due to the metals loading levels. However, in the notoriously unpredictable hydrocarbon catalysis art, a catalyst having improved yield stability and increased liquid volume yield is always much desired.

SUMMARY OF THE INVENTION

In a broad embodiment, the present invention comprises a catalyst composition comprising about 0.24 to about 0.26 weight percent platinum and about 0.48 to about 0.52 weight percent rhenium disposed on a spheroidal alumina carrier.

In an alternative embodiment, the present invention provides for a reforming process for using a catalyst composition comprising 0.24 to 0.26 weight percent platinum and 0.48 to 0.52 weight percent rhenium disposed on an spheroidal alumina carrier.

We have found catalyst performance, particularly yield stability, to be affected by sulfur content in the hydrocarbon feed to the reactor containing Pt-Re catalyst.

We believe that at reforming conditions, sulfur in the feed alters the metals/acidity balance, significantly affecting catalyst performance. The catalyst of our claimed invention performs surprisingly well in reforming of hydrocarbons, which we believe is due in part to the acheivement of a metals loading which better balances the metals/acidity characteristics of the catalyst.

Among other factors, we found that when a spheroidal alumina, particularly gamma-alumina, catalyst base particles were loaded with a level of Pt and Re equivalent to the reactor-loaded density of Rheniforming F, surprisingly advantageous results were achieved in catalyst yield stability. Run-life increased about 15%, compared to the extruded Rheniforming F catalyst with the same reactor loaded metals density. Alternatively expressed, the "fouling rate" for our new catalyst was about 87% of that of Rheniforming F, with the same reactor-loaded metals density. Surprisingly, we also found LV% yield to improve for a reforming process utilizing the catalyst of the present invention. Yields of $C_3$'s and $C_4$ compounds were also lower, indicating a surprisingly lower cracking activity, and thus resulting in an increased liquid volume yield.

BRIEF DESCRIPTION OF DRAWINGS

FIG. 1 is a graphical representation of the catalytic activity over time for three catalysts: Rheniforming F, the catalyst composition of our present invention, and a third commercially available reforming catalyst.

FIG. 2 is a graphical representation of liquid yield for three catalysts: Rheniforming F, the catalyst of our present invention, and a third commercially available reforming catalyst.

DETAILED DESCRIPTION

The preferred refractory inorganic oxide for use in the present invention is alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0l g/cc and surface area characteristics such that the average pore diameter is about 20 to 300 Angstroms, the pore volume is about 0.1 to about 1 cc/g and the surface area is about 100 to about 500 m$^2$/g. There are several commercial routes to pure alumina.

Although alumina is the preferred refractory inorganic oxide, a preferred alumina is that which has been characterized in U.S. Pat. Nos. 3,852,190 and 4,012,313 as a byproduct from a Ziegler higher alcohol syntheses reaction as described in Ziegler's U.S. Pat. No. 2,892,858. For purposes of simplification such an alumina will be hereinafter referred to as a "Ziegler alumina." Ziegler alumina is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB--a spray-dried powder having a typical surface area of about 250 m$^2$/g; (2) Catapal MG--a rotary kiln dried alumina having a typical surface area of about 180 m$^2$/g; and (3) Dispal, a product having a typical surface area of about 185 m$^2$/g. For purposes of the present invention, a preferred starting material is the spray-dried powder, Catapal SB. This alpha-alumina monohydrate powder may be formed into a suitable catalyst material according to any of the techniques known to those skilled in the catalyst carrier material forming art. Spherical carrier material particles may be formed, for example, from this Ziegler alumina by: (I) converting the alpha-alumina monohydrate powder into an alumina sol by reaction with a suitable peptizing acid and water and thereafter dropping a mixture of the resulting sol and a gelling agent into an oil bath to form spherical particles of an alumina gel which are easily converted to a gamma-alumina carrier material by known methods.

Preferred carrier materials have an apparent bulk density of about 0.3 to about 0.8 g/cc and surface area characteristics such that the average pore diameter is about 20 to 300 Angstroms, the pore volume is about 0.1 to about 1 ml/g and the surface area is about 100 to about 500 m$^2$/g. In general, best results are typically obtained with a gamma-alumina carrier material which is used in the form of spherical particles having: a relatively small diameter (i.e., typically about 1/16 inch), an apparent bulk density of about 0.75 g/cc, a pore volume of about 0.4 ml/g, and a surface area of about 175 m$^2$/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution of further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. Size of the sheres are determined primarily by fluid hydraulics and volume considerations in the loaded reactor. While not limiting our present invention in any way, we have found a particle size of about 1/16th inch diameter to be preferred. See U.S. Pat. No. 2,620,314, the teachings of which are fully incorporated by reference herein, for additional details. Other patents describing the oil-drop method of manufacturing spheroidal alumina carriers are U.S. Pat. Nos. 3,887,493 to Hayes, 3,919,117 to Michalko, and 3,979,334 to Lee et al., all of which are incorporated by reference herein for the teaching of the oil-drop method.

One of the advantages of a spheroidal alumina carrier is a high crush strength relative to extruded alumina carriers.

A particularly preferred alumina is that which has been produced by electrolysis. Production of alumina through electrolytic purification is well known in the art, and is described in Kirk Othmer, p. 152-154. The Encyclopedia of Chemical Processing and Design, Vol. 3, p.66-67 also describes electrolytic refining of aluminum. Electrolysis produced alumina is particularly free of impurities such as titanium compounds. While not limiting our invention in any way, or due to any particular theory of operation, we believe the absence of titanium in the alumina source gives a spheroidal catalyst, having our claimed metals loading, superior properties relative to other catalysts previously known. Additionally, electolytically produced alumina has fewer alkali metals (such as sodium and potassium) and fewer alkaline earth metals (such as calcium and magnesium), the presence of which have been found to be undesirable in catalyst carrier material.

The platinum and rhenium are disposed in intimate admixture with each other on the porous inorganic oxide catalyst support. The platinum and rhenium can be disposed by suitable techniques such as ion-exchange, coprecipitation, impregnation, etc. One of the metals can be associated with the carrier by one procedure, for example ion-exchange, and the other metal associated with the carrier by another procedure, e.g., impregnation. However, the metals are usually associated with the porous inorganic oxide support by impregnation. The catalyst can be prepared either by coimpregnation of the metals onto the porous inorganic oxide carrier or by sequential impregnation. In general, the carrier material is impregnated with an aqueous solution of a decomposable compound of the metal in sufficient concentration to provide the desired quantity of metal in the finished catalyst and the resulting mixture is then heated to remove volatiles. Chloroplatinic acid is an example of an acceptable source of platinum. Other feasible platinum-containing compounds, e.g., ammonium chloroplatinates and polyammineplatinum salts, can also be used. Rhenium compounds suitable for incorporation onto the carrier include, among others, perrhenic acid and ammonium perrhenates.

Incorporation of the metals with the carrier ca be accomplished at various stages of the catalyst preparation. For example, if the metals are to be incorporated in intimate admixture with the alumina support, the incorporation may take place while the alumina is in the sol or gel form followed by precipitation of the alumina. Alternatively, a previously prepared alumina carrier can be impregnated with a water solution of the metal compounds. Regardless of the method of preparation of the supported platinum-rhenium catalyst it is desired that the platinum and rhenium be in intimate admixture with each other on the support and furthermore that the platinum and rhenium be uniformly dispersed throughout the porous inorganic oxide catalyst support.

The reforming activity of the catalyst is promoted by the addition of halides, particularly fluoride or chloride. Chloride is preferred. The halides provide a limited amount of acidity to the catalyst which is beneficial to most reforming operations. The catalyst promoted with halide preferably contains from 0.1 to 2 weight percent total halide content and more preferably from 0.5 to 1.5 weight percent, and still more preferably about 1 wt.% total halide content. The halides can be incorporated onto the catalyst carrier at any suitable stage of catalyst manufacture, e.g., prior to or following incorporation of the platinum and rhenium. Some halide is often incorporated onto the carrier when impregnating with the metals; e.g., impregnation with chloroplatinic acid results in chloride addition to the carrier. Additional halide can be incorporated onto the support simultaneously with incorporation of the metal(s) if so desired. In general, halides are combined with the catalyst carrier by contacting suitable compounds such as hydrogen fluoride, ammonium fluoride, hydrogen chloride, or ammonium chloride, either in the gaseous form or in a water soluble form with the carrier. Preferably, the fluoride or chloride is incorporated onto the carrier from an aqueous solution containing the halide. Preferably, low levels of halide are added during the reforming operation. This can typically be accomplished by adding an organohalide, such as t-butyl chloride, to the feed at a rate of about 1 ppm based upon the feed rate to the reformer.

Following incorporation of platinum and rhenium with the porous inorganic oxide, the resulting composite is usually dried by heating at an elevated temperature usually no greater than about 500° F. and preferably at about 200° F. to 400° F. Thereafter the composite is usually calcined at an even higher temperature, e.g., from about 800° F. up to about 1300° F. Calcination at less than 1100° F. is preferred.

Subsequently, the carrier containing platinum and rhenium is heated at an elevated temperature in a reducing atmosphere to convert the platinum to the metallic state and reduce the valence state of the rhenium. Preferably the heating is performed in the presence of hydrogen, and more preferably in the presence of dry hydrogen. In particular, it is preferred that this reduction be accomplished at a temperature in the range of 500° F. to 1000° F.

The catalyst composite used in the present invention, i.e., platinum and rhenium supported on a porous inorganic oxide spheroidal carrier, should be sulfided for use in the naphtha reforming process. Presulfiding can be done in situ or ex situ by passing a sulfur-containing gas, e.g., $H_2S$, through the catalyst bed. Other presulfiding techniques are known in the prior art. The exact form of the sulfur used in the sulfiding process is not critical. The sulfur can be introduced to the reaction zone in any convenient manner. It can be contained in the liquid hydrocarbon feed, the hydrogen rich gas, a recycle liquid stream or a recycle gas stream or any combination thereof. After operating the reforming process in the presence of sulfur for a period of time short in comparison to the over-all run length which can be obtained with the catalyst, the addition of sulfur is preferably discontinued. The purpose for presulfiding the catalyst prior to contact with the naphtha or sulfiding the catalyst during the initial contact with naphtha is to reduce excessive hydrocracking activity of the catalyst which results in the production of high yields of light hydrocarbon gases, for example, methane.

For the purposes of this invention, the end of the reforming run (EOR) is defined as the time when the liquid yield has dropped by 1 LV% from its maximum value and product octane is maintained constant or an average catalyst bed temperature of 1000° F. is reached.

The present invention will be more fully understood by reference to the following examples. They are intended to be purely exemplary and are not intended to limit the scope of the invention in any way.

EXAMPLES

Example 1

Preparation of Platinum/Rhenium Catalysts

A 2:1 rhenium to platinum spherical catalyst would be prepared by a pore-fill method by incipient wetness beginning with the following solution: a chloroplatinic acid solution which contains: 0.237 grams (g) of Pt as metal; a perrhenic acid solution which contain 0.474 g of Re as metal; and aqueous HCl which contains 1.10 g of chloride. This solution of the three components is diluted to a total volume of 59 ml with deionized water. The solution is contacted, (i.e. sprayed or slowly dripped), in a manner to assure substantially even deposition of metals on alumina. The impregnated alumina is allowed to stand for 16 hrs and then dried for 2 hrs at 250° F. Next, it is calcined for 2 hrs at 950° F. in flowing dry air. Analysis of the catalyst would show 0.24 wt % Pt, 0.48 wt % Re, and 1.0 percent Cl. The resulting catalyst has a bulk density of 0.77 g/cc, a pore volume of 0.55 cc/g, and a nitrogen surface area of 195 $m^2/g$.

Example 2

Start-up Procedure

After the platinum and rhenium had been added to the solid support and after calcination, the catalyst was loaded in a reactor unit. The reactor was a one-inch tube with an internal diameter of ⅜ inch. A volume of 80 cc of catalyst were loaded.

Dry air was passed through the reactor unit and the temperature was raised to 400° F. and held for 0.5 hour. The temperature was then raised to 600° F., held for 0.5 hour; to 800° F. and held for 0.5 hour; and to 950° F.

and held for at least 2.0 hours so that the water content of the effluent gas was 100 ppm or less. The reactor was then cooled to 800° F. with nitrogen.

The catalyst was reduced with hydrogen at 800° F., and then purged with nitrogen and cooled to 600° F. At 650° F., the feed of Example 3 was introduced at a rate of 120 cc per hour. The reactor temperature was increased to 825° F. at a rate of 25° F. per hour.

The catalyst was sulfided during feed start-up by injecting a 4.0 percent solution of di-methyl disulfide in the feed at 0.35 cc per hour. Injection continued for 5.5 hours or until sulfide break-through at about 3-5 ppm $H_2S$ was observed. The water level was maintained below 25 ppm using a recycle dryer.

EXAMPLE 3

Feed Properties and Reforming Conditions

The feed for all the reforming runs was an Arabian Naphtha having an API gravity of 60.6; 63.5% paraffins, 27.3% naphthenes and 9.2% aromatics. The D-86 distillation (%—° F.) showed start—168; 5—202; 10—210; 20—218; 30—226; 40—234; 50—241; 60—253; 70—269; 80—289; 90—316; 95—331 end—377.

Reaction conditions were 200 psig, 2.0 liquid hourly space velocity (LHSV), 3.5 hydrogen to fresh feed hydrocarbon mol ratio, and constant product octane of 100 RON. T-butyl chloride was injected (1 ppm) with the feed to maintain the chloride level on the catalyst at about 1 wt.%.

Example 4

Comparative Catalyst A

A 1:2 Pt/Re catalyst was prepared as in Examples 1 and 2, except that the catalyst base was an alumina extrudate, substantially cylindrical n shape, having the following properties: Surface Area was equal to about 190 $M^2/G$, particle density was equal to about 0.98 measured on base before impregnation, Chloride wt.% was equal to about 1.4%. Metal loadings were 0.3 wt % Pt and 0.6 wt % Re.

Example 5

Comparative Catalyst B

A commercially available extruded and substantially cylindrical reforming catalyst, CAT B, having a metals loading of 0.22 wt % Pt and 0.44 wt % Re was purchased from a commercial catalyst supplier. The startup procedure of Example 2 was used.

Example 6

Reforming Comparisons

The three catalysts—the catalyst of this invention prepared by Examples 1 and 2, the catalyst of Example 4 and the Catalyst of Example 5 were compared at substantially identical reaction conditions with identical feeds, as described in Example 3. Metal loadings in the reactor were substantially identical at 0.12 lbs/ft$^3$ Pt, and 0.24 lbs/ft$^3$ Re for the catalyst of our invention and comparative catalyst A.

The results are shown in FIGS. 1 and 2. As can be seen, the catalyst of the present invention, labelled "CR-63", gives improved life (defined by end-of-run at 1000° F.) and improved liquid volume yields.

What is claimed is:

1. A catalyst composition comprising 0.5 to 2.0 weight percent chlorine, 0.24 to 0.26 weight percent platinum and 0.48 and 0.52 weight percent rhenium disposed on a spheroidal alumina carrier.

2. The catalyst composition of claim 1 wherein the alumina is gamma-alumina.

3. The catalyst composition of claim 1 further comprising about 1 weight percent chlorine.

* * * * *